United States Patent Office 2,777,579
Patented Jan. 15, 1957

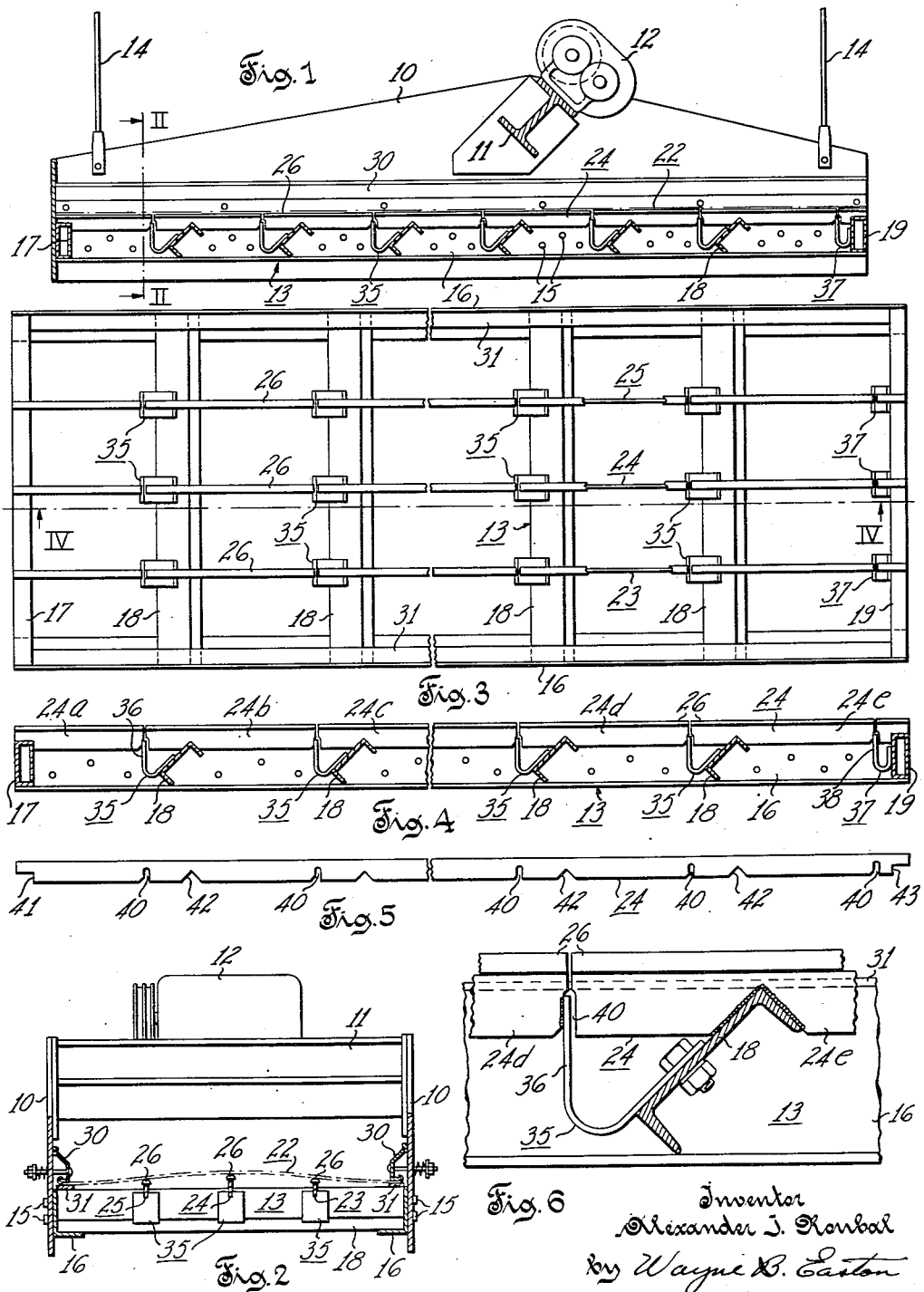

2,777,579
SCREEN CLOTH SUPPORTING FRAME FOR A VIBRATING SCREEN

Alexander J. Roubal, Milwaukee, Wis., assignor to Allis-Chalmers Manufacturing Company, Milwaukee, Wis.

Application March 12, 1953, Serial No. 341,876

10 Claims. (Cl. 209—412)

This invention relates to vibrating screens and more specifically to a screen cloth supporting frame for a vibrating screen.

A vibrating screen normally has a resiliently supported main frame equipped with a vibration inducing mechanism for causing vibratory movement of the main frame. A generally rectangular screen cloth supporting frame across which a screen cloth is stretched and fastened is securely attached to the main frame for vibration therewith.

The screen cloth supporting frame normally has spaced parallel side members, transverse members connecting the side members and several stringers mounted on the transverse members in spaced parallel relation to the side members. The stringers form supports across which the screen cloth is stretched after the screen cloth supporting frame is attached to the main frame of the vibrating screen.

In prior art screens the stringers for screen cloth supporting frames are each formed in one piece extending the entire length of the supporting frame upon which the stringers are mounted. When a relatively hot material having a temperature on the order of 600 to 700° F. is screened, the temperature of the stringers rises to about 250 or 300° F. At this temperature the one piece stringers expand linearly and, as each stringer is rigidly attached at points longitudinally thereof to the transverse members of the supporting frame, the stringers become warped and twisted. Although the side members and transverse members of the supporting frame are normally made sturdy enough to withstand the warping of the stringers, the warping of the stringers causes the screen cloth to be unsupported at various points so that the screen cloth becomes slack and loses its tautness at these points. The unsupported slack portions of the screen cloth vibrate relative to the screen cloth surrounding the slack portions and relative to the supporting frame. This secondary vibration of portions of the screen cloth causes the screen cloth to become weakened and tear due to fatigue. Oftentimes this tearing of the screen cloth occurs before there are any signs of normal wear of the screen cloth caused by the flow of material screened.

In the present invention, each of the stringers for the cloth supporting frame is segmented by being formed into a plurality of short bars which are longitudinally spaced from adjacent bars to allow for linear expansion of the bars. Structural means by which the bars comprising each stringer may be attached to the cloth supporting frame and a method of so doing are set forth in the detailed description of the invention set forth hereinafter.

Referring to the objects of the invention, it is a main object to provide a screen cloth supporting frame in which the stringers across which the screen cloth is stretched do not warp or become twisted when subjected to relatively high temperatures.

Another object is to form each of the stringers of the cloth supporting frame into segments or short bars spaced longitudinally from adjacent segments to allow for linear expansion of the segments and to provide means for attaching the segments to the screen supporting frame which allows each of the segments to expand linearly.

Another object is to provide a method of attaching segmented stringers to a screen cloth supporting frame.

As one of the major expenses in screening materials is the cost of screen cloth replacements, an overall advantage and object of the invention is to provide a new and improved screen cloth supporting frame which enables the life of the screen cloth to be prolonged.

Other objects and advantages will appear from a detailed description of the invention, an example of which is described below and illustrated in the accompanying drawing.

In the drawing:

Fig. 1 is a sectional elevation of a vibrating screen assembly embodying the invention;

Fig. 2 is a sectional view taken on line II—II of Fig. 1;

Fig. 3 is an enlarged plan view of a screen cloth supporting frame which is a part of the assembly shown in Fig. 1;

Fig. 4 is a sectional view taken on line IV—IV of Fig. 3;

Fig. 5 shows the stringer member of the screen cloth supporting frame assembly of Fig. 4 as it appears at an intermediate stage during the construction of the screen cloth supporting frame;

Fig. 6 is a fragmentary sectional view corresponding to a portion of Fig. 4.

Figure 7:
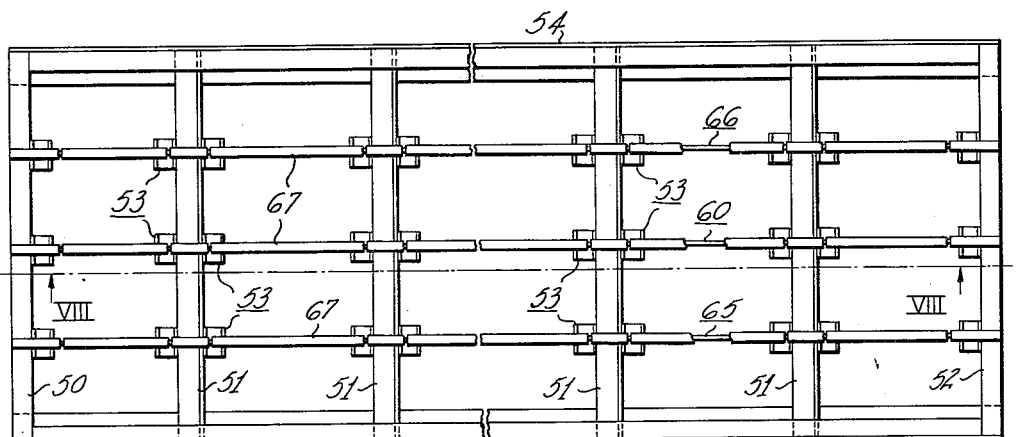
Figs. 7, 8, 9 and 10 illustrate a second embodiment of the invention and correspond generally to Figs. 3, 4, 5 and 6.

The vibrating screen illustrated in Fig. 1 comprises a main frame having heavy metal side plates 10, an I-shaped cross member 11 connecting plates 10, a vibration inducing mechanism 12, and a screen cloth supporting frame assembly 13. Cables 14 and overhead springs (not shown) support the vibrating screen so that it may be caused to vibrate by operating mechanism 12.

The screen cloth supporting frame assembly 13 is installed as a unit between side plates 10 of the main frame of the screen where it is held in place by bolts 15. Assembly 13 comprises, in part, parallel side members 16 having angle shaped sections and transverse members 17, 18 and 19 having channel and box shaped sections for connecting side members 16 at spaced intervals longitudinally thereof.

Screen cloth supporting frame 13 serves to support a screen cloth 22 and, to adapt frame 13 for this purpose, segmented stringers 23, 24 and 25 are mounted on frame 13 in parallel spaced relation relative to side members 16. Stringers 23, 24 and 25 form supports across which screen cloth 22 may be stretched and tensioned. Stringer 24 may be of greater height than stringers 23 and 25, as shown in the drawing, so that screen cloth 22 forms a crowned surface. Buffer bars 26 having smooth surfaces may be utilized between the stringers and the cloth so that the cloth will present a smooth and even surface. Screen cloth tensioning means 30, of known construction, are utilized to tension screen cloth 22 and elongated bar members 31, attached to transverse members 17, 18 and 19, are provided for cooperation with tensioning means 30.

The main feature of the invention, described in detail hereinafter, is in forming each of the stringers 23, 24 and 25 for the cloth supporting frame 13 with relatively short, longitudinally spaced bars and providing structural means which permit the bars to freely expand linearly relative to each other. The invention relates to both the structural means and a method for mounting the bars on cloth supporting frame 13. Only stringer 24 will be referred to in detail and the segments or relatively short bars comprising stringer 24 are designated as 24a, 24b, 24c, 24d and 24e. The short bars 24a, 24b, 24c, 24d and 24e may have any desired cross sectional shape within the scope of the invention. Although the short bars are shown with rectangular cross sections, the word bar as used herein includes pipes, rods, channels, angles and other elongated structural elements.

As shown in Figs. 1 and 4, transverse members 17 and 19 are positioned vertically and transverse channel members 18 may be inclined as shown. V-shaped mounting plates 35 are attached to transverse members 18 in three aligned rows parallel to side members 16. Each of the plates 35 has one leg 36 extending or projecting vertically, as a cantilever, which is flexibly yieldable in a direction parallel to side members 16. U-shaped mounting plates 37, having vertically extending legs 38, are mounted in a similar manner on transverse member 19.

A one piece stringer 24 in the form shown in Fig. 5 is provided with slots 40 for respectively receiving the projecting end portions of legs 36 and 38 of plates 35 and 37 and is provided with recesses 41, 42 and 43 for respectively receiving the upper portions of transverse members 17, 18 and 19. The one piece stringer 24 is then placed in position and is attached as by welding to all of the transverse members 17, 18 and 19 and is attached as by welding to the left sides of legs 36 and 38 of plates 35 and 37. Stringers 23 and 25 are attached in a like manner. The top surfaces of stringers 23, 24 and 25 may then be machined and buffer bars 26 may be attached, as by welding, to the tops of the stringers if desired. Each of the stringers is then severed, as indicated in Fig. 6, with a cutting torch or other means at places longitudinally thereof between the points where the stringer is attached to the legs 36 of plates 35 and the points where the stringer is attached to the respective transverse members 18 to which plates 35 are attached. At the right side of the frame (see Fig. 4) the stringer is severed between leg 38 of plate 37 and transverse member 19. If buffer bars 26 are utilized, they are severed at the same points that the stringers are severed.

After the stringers are severed in the places indicated it is seen that each of the stringers 23, 24 and 25 comprises a plurality of short bars or segments in longitudinally aligned relation parallel to side members 16 of the screen cloth supporting frame 13. In effect, portions of the stringer between each pair of short bars are removed to allow room for the bars to expand linearly. For stringer 24 the short bars or segments are designated by numerals 24a, 24b, 24c, 24d and 24e. Referring to Fig. 4, the left side of bar 24a is anchored to transverse member 17 and the right side of bar 24a is attached to the projecting cantilever portion or leg 36 of the plate 35 on the adjacent transverse member 18. Each of the bars of stringers 23, 24 and 25 are mounted in a similar manner and, as the cantilever portions of the plates are flexibly yieldable, each of the bars can expand linearly. The bars are spaced longitudinally from adjacent bars a sufficient distance to allow each of the bars to expand linearly without contacting adjacent bars. Thus, when a highly heated material passes over screen cloth 22 the cantilever portions 36 and 38 of plates 35 and 37 allow the individual bars, with or without buffer bars attached thereto, to expand linearly without warping. As warpage of the bars is avoided, the bars, or buffer bars attached thereto, remain in contact with the screen cloth at all points such that the cloth remains uniformly taut and an undesirable slackness in the cloth does not occur.

A second embodiment of the invention is shown in Figs. 7, 8, 9 and 10 which correspond generally to Figs. 3, 4, 5 and 6.

In this embodiment, transverse members 50, 51 and 52 having box sections are positioned vertically. U-shaped mounting plates 53 are attached on opposite sides of each transverse member 51 in three aligned rows parallel to side members 54. Each of the plates 53 has one leg 55 extending or projecting vertically as a cantilever which is flexibly yieldable in a direction parallel to side members 54.

Figure 8:
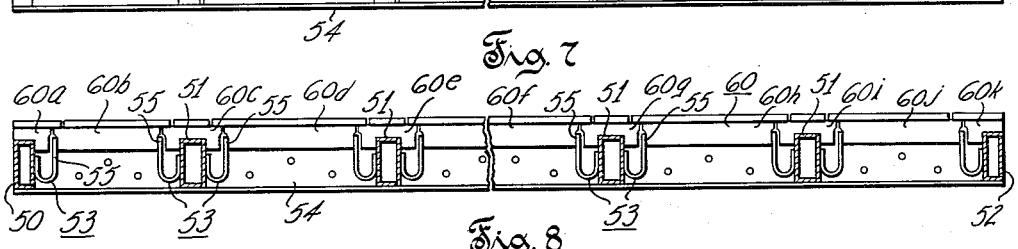
Figure 9:
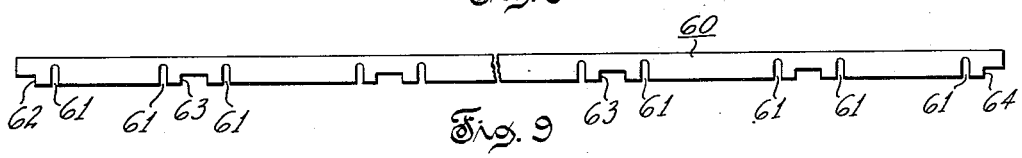
Figure 10:
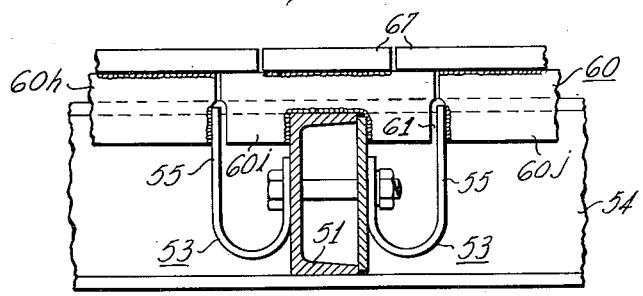

A one piece stringer 60 in the form shown in Fig. 9 is provided with slots 61 for respectively receiving the projecting end portions of legs 55 of plates 53 and is provided with recesses 62, 63, and 64 for respectively receiving the upper portions of transverse members 50, 51 and 52. The one piece stringer 60 is then placed in position and is attached as by welding to all of the transverse members 50, 51 and 52 and is attached as by welding to the legs 55 of plates 53 as shown in Fig. 10. Stringers 65 and 66 may then be machined and each of the stringers is then severed at places longitudinally thereof, as indicated in Figs. 7, 8 and 10, with a cutting torch or other means.

After the stringers are cut in the places indicated it is seen that each of the stringers 60, 65 and 66 comprises a plurality of bars or segments in longitudinally aligned relation parallel to side members 54 of the screen cloth supporting frame. For stringer 60 the bars or segments are designated by numerals 60a, 60b, 60c, 60d, 60e, 60f, 60g, 60h, 60i, 60j and 60k. Referring to Fig. 8, the bar 60a is mounted on transverse member 50 and bar 60b has its end portions attached respectively to the projecting cantilever portions or legs 55 of the plates 53 which are attached respectively to transverse member 50 and the adjacent transverse member 51. Each of the remaining bars of stringer 60 and the respective bars of stringers 62 and 66 are mounted in a similar manner and, as the cantilever portions of the plates 53 are flexibly yieldable, each of the bars can expand linearly. The bars are spaced longitudinally from adjacent bars a sufficient distance to allow each of the rods to expand linearly without contacting adjacent rods.

In this embodiment buffer bars 67, if utilized, may be attached, after stringers 60, 65 and 66 are severed, in a manner such that segments of buffer bars 67 bridge the spaces between the bars comprising the stringers. Bars 60b, 60d, 60f, 60h and 60j of stringer 60 (Fig. 8) are not as stably mounted as bars 24a, 24b, 24c, 24d and 24e of stringer 24 (Fig. 4) and the bridging portions of segments of buffer bars 67 function to prevent bars 60b, 60d, 60f, 60h and 60j from being forced downwardly out of alignment. Buffer bars could also be mounted and utilized in this manner or the first described embodiment of the invention if desired.

The present invention pertains to the novelty of the screen cloth supporting frames disclosed as well as the particular method of construction described herein. It will thus be understood that the scope of the appended apparatus claims is in no way limited to any particular method of constructing the apparatus defined therein. It will further be understood that the precise structures and method described and illustrated may be modified within the scope of the appended claims by such equivalents as may readily occur to persons skilled in the art to which the invention pertains.

It is claimed and desired to secure by Letters Patent:

1. A method of constructing for a vibrating screen a screen cloth supporting frame of the type having spaced parallel side members and transverse members connecting the side members intermediate their ends, comprising, the steps of attaching plates to said transverse members having projecting legs which are flexibly yieldable in a direction parallel to said side members, mounting at least one stringer on said frame in parallel spaced relation to said side members by attaching said stringer to the legs of said plates and to said transverse members as by welding, and forming each stringer into segments by removing portions of each stringer at places longitudinally thereof to form air gaps between the segments and thereby allow for linear expansion of the segments, each of said portions being removed respectively from between the point where said stringer is attached to one of said plates and the point where said stringer is attached to the transverse member to which said one of said plates is attached.

2. A method of constructing for a vibrating screen a screen cloth supporting frame of the type having spaced parallel side members and transverse members connecting the side members intermediate their ends, comprising, the steps of attaching flexible plates to said transverse members which are flexibly yieldable in a direction parallel to said side members, mounting stringers on said frame in parallel spaced relation to said side members by attaching said stringers to said plates and said transverse members as by welding, and forming each stringer into segments by removing portions of each stringer at places longitudinally thereof to form air gaps between the segments and thereby allow for linear expansion of the segments, each of said portions being removed respectively from between the point where the stringer is attached to one of said plates and the point where said stringer is attached to the transverse member to which said one of said plates is attached.

3. A method of constructing for a vibrating screen a screen cloth supporting frame of the type having spaced parallel side members and transverse members connecting the side members intermediate their ends, comprising, the steps of attaching flexible plates to said transverse members which are flexibly yieldable in a direction parallel to said side members, mounting stringers on said frame in parallel spaced relation to said side members by attaching said stringers to said plates and said transverse members as by welding, and severing each stringer at places longitudinally thereof and with respect to each of said plates to form an air gap between the point where the stringer is attached to one of said plates and the point where said stringer is attached to the transverse member to which said one of said plates is attached.

4. A method of constructing for a vibrating screen a screen cloth supporting frame of the type having spaced parallel side members and transverse members connecting the side members intermediate their ends, comprising, the steps of attaching flexible mounting plates to said transverse members having vertically extending portions which are flexibly yieldable in a direction parallel to said side members, mounting on said frame in parallel relation to said side members a stringer formed with recesses for receiving said transverse members and said extended portions of said plates by attaching said stringers to said plates and said transverse members as by welding, and forming each stringer into segments with air gaps therebetween by removing portions of each stringer at places longitudinally thereof to allow for linear expansion of the segments, each of said portions being removed respectively from between the points where the stringer is attached to said plates and the points where said stringer is attached to the transverse members to which said plates are respectively attached.

5. A screen cloth supporting frame for a vibrating screen, comprising, spaced parallel side members, transverse members connecting the side members intermediate their ends, a plurality of plates mounted on said transverse members having projecting portions which are flexibly yieldable in a direction parallel to said side members, and a plurality of bars mounted on said frame in longitudinally aligned relation parallel to said side members with each bar being longitudinally spaced from an adjacent bar to define an air gap therebetween and thereby provide for linear expansion of the bars, at least one of each pair of adjacent bars having one end thereof attached to a projecting portion of one of said plates and the other end thereof operably attached to one of said transverse members.

6. A screen cloth supporting frame for a vibrating screen, comprising, spaced parallel side members, transverse members connecting the side members intermediate their ends, means mounted on said transverse members having flexible portions which are yieldable in a direction parallel to said side members, and a plurality of bars mounted on said frame in longitudinally aligned relation parallel to said side members with each bar being longitudinally spaced from an adjacent bar to define an air gap therebetween and thereby provide for linear expansion of the bars, at least one of each pair of adjacent bars having one end thereof attached to one end of said flexible portions and the other end operably attached to one of said transverse members.

7. A screen cloth supporting frame for a vibrating screen, comprising, spaced parallel side members, transverse members connecting the side members intermediate their ends, a plurality of V-shaped plates each having one leg thereof attached to a transverse member such that the other leg extends vertically and is flexibly yieldable relative to the transverse member in a direction parallel to said side members, and a plurality of bars mounted on said frame in longitudinally aligned relation parallel to said side members with each bar being longitudinally spaced from an adjacent bar to define an air gap therebetween and thereby provide for linear expansion of the bars, each of said bars being respectively attached at one end to one of said transverse members and at the other end to the vertically extending leg of one of said plates mounted on an adjacent transverse member.

8. A screen cloth supporting frame for a vibrating screen, comprising: spaced parallel side members; transverse members connecting the side members intermediate their ends; a plurality of U-shaped plates mounted on opposite sides of each of said transverse members, each of said plates having one leg thereof attached to a transverse member such that the other leg extends vertically and is flexibly yieldable relative to the transverse member in a direction parallel to said side members; and a plurality of bars mounted on said frame in longitudinally aligned relation parallel to said side members with each bar being longitudinally spaced from an adjacent bar to define an air gap therebetween and thereby provide for linear expansion of the bars, at least one of each pair of adjacent bars having both ends thereof attached respectively to the projecting portions of two of said plates, said plates being attached respectively to two adjacent transverse members.

9. A screen cloth supporting frame for a vibrating screen, comprising, spaced parallel side members, transverse members connecting the side members intermediate their ends, a plurality of plates mounted on said transverse members having projecting portions which are flexibly yieldable in a direction parallel to said side members, and a plurality of bars mounted on said frame in longitudinally aligned relation parallel to said side members with each bar being longitudinally spaced from an adjacent bar to define an air gap therebetween and thereby provide for linear expansion of the bars, each of said bars being respectively attached at one end to one of said transverse members and at the other end to the flexible projecting portion of the plate mounted on an adjacent transverse member.

10. A screen cloth supporting frame for a vibrating screen, comprising, spaced parallel side members, transverse members connecting the side members intermediate their ends, means mounted on said transverse members having portions which are flexibly yieldable in a direction parallel to said side members, and a plurality of bars mounted on said frame in longitudinally aligned relation parallel to said side members with each bar being longitudinally spaced from an adjacent bar to define an air gap therebetween and thereby provide for linear expansion of the bars, each of said bars being respectively attached at one end to one of said transverse members and at the other end to the flexible portion of one of said means mounted on an adjacent transverse member.

References Cited in the file of this patent

UNITED STATES PATENTS

| 2,151,292 | Brickman | Mar. 21, 1939 |
| 2,308,572 | Symons | Jan. 19, 1943 |
| 2,382,245 | McCormack | Aug. 14, 1945 |
| 2,636,607 | Roubal | Apr. 28, 1953 |